(12) United States Patent
Dick et al.

(10) Patent No.: US 11,839,983 B2
(45) Date of Patent: Dec. 12, 2023

(54) SYSTEMS AND METHODS FOR ROBOTIC GRASP VERIFICATION

(71) Applicant: Ocado Innovation Limited, Hatfield (GB)

(72) Inventors: Ryan John Dick, West Toronto (CA); James Sterling Bergstra, West Toronto (CA); Lavi Shpigelman, West Toronto (CA)

(73) Assignee: Ocado Innovation Limited, Hatfield (GB)

( * ) Notice: Subject to any disclaimer, the term of this patent is extended or adjusted under 35 U.S.C. 154(b) by 916 days.

(21) Appl. No.: 16/696,053

(22) Filed: Nov. 26, 2019

(65) Prior Publication Data

US 2020/0164517 A1 May 28, 2020

Related U.S. Application Data

(60) Provisional application No. 62/771,911, filed on Nov. 27, 2018.

(51) Int. Cl.
*B25J 9/16* (2006.01)
*G06N 20/00* (2019.01)
*G06N 3/04* (2023.01)

(52) U.S. Cl.
CPC .......... *B25J 9/1682* (2013.01); *B25J 9/1697* (2013.01); *G06N 3/04* (2013.01); *G06N 20/00* (2019.01)

(58) Field of Classification Search
USPC .................................................. 700/245–264
See application file for complete search history.

(56) References Cited

U.S. PATENT DOCUMENTS

| | | | |
|---|---|---|---|
| 10,102,449 B1 * | 10/2018 | Cosic | G06V 10/454 |
| 2017/0106542 A1 * | 4/2017 | Wolf | B25J 9/0081 |
| 2017/0334066 A1 * | 11/2017 | Levine | G05B 13/027 |
| 2018/0204111 A1 * | 7/2018 | Zadeh | G06V 10/764 |
| 2018/0370027 A1 * | 12/2018 | Oota | G06F 18/217 |
| 2019/0126472 A1 * | 5/2019 | Tunyasuvunakool | G06N 3/084 |
| 2019/0130216 A1 * | 5/2019 | Tomioka | G06F 18/214 |
| 2020/0368616 A1 * | 11/2020 | Delamont | A63F 13/65 |

* cited by examiner

*Primary Examiner* — Jonathan L Sample
(74) *Attorney, Agent, or Firm* — Seed IP Law Group LLP

(57) ABSTRACT

The present disclosure generally relates to the control of robotic end-effectors in order to manipulate objects. An exemplary method includes updating a classifier based on sensor data obtained at a first time and applying the updated classifier to second sensor data obtained at a second time, to assess status of a robotic end-effector with respect to one or more objects. The method further includes determining a robotic action based on the status assessed and causing a robotic device including the robotic end-effector to perform the robotic action.

19 Claims, 8 Drawing Sheets

|  | Action | | |
|---|---|---|---|
|  | Abort | Continue | Stow |
| 0 items | -1 | -0.1 | -2 |
| 1 item | -1 | -0.1 | 5 |
| 2+ items | -1 | -0.1 | -10 |

True Class (row label)

FIG. 8

SYSTEMS AND METHODS FOR ROBOTIC GRASP VERIFICATION

CROSS-REFERENCE TO RELATED APPLICATION

This application is related to, and claims benefit of and priority from Provisional Application No. 62/771,911 filed Nov. 27, 2018, the complete subject matter of which is hereby incorporated herein by reference in its entirety.

BACKGROUND

Field

Embodiments of the present disclosure relate generally to the control of robotic end-effectors, in order to manipulate objects for various purposes, such as, for example, picking, sorting, handling, packaging, and assembly.

Description of Related Art

Robots are systems, machines, or devices that are capable of carrying out one or more tasks. A robot is an electro-mechanical machine controlled by circuitry, for example a processor following processor-executable instructions; a human operator controllable electro-mechanical machine; a robotic subsystem of another machine including another robot; or the like. A robot has the ability to move in a physical space and to accomplish physical tasks. Robots may be operated by a human operator, such as, via remote control, or may operate autonomously without control of an operator. Hybrid robots exist in which some functions are autonomous while others are operator controlled or control switches between autonomous and operator controlled modes. As well, a robot includes computational resources to preform computational tasks. The computational tasks can be in aid of the physical tasks.

Generally speaking, an end-effector or end-of-arm tool (EOAT) is a device or component at the terminal, distal end of a robotic arm and can be configured to perform one or more of various actions, and may take the form of a gripper, a cutting tool, or other device. Robotic manipulators, which represent one type of robotic end effector, are generally configured to grasp or otherwise hold objects and move the objects in space. Robotic manipulators may be impactive robotic manipulators, which typically use jaws, fingers, or other similar mechanisms to grasp an object to be moved, such that the object is held by frictional forces. Robotic manipulators may also be astrictive robotic manipulators, which typically use vacuum, magnetic, or electrical devices, or other similar mechanisms, to grasp an object to be moved, such that the object is held by attractive forces such as suction, magnetism, or electroadhesion.

BRIEF DESCRIPTION OF THE DRAWINGS

Various embodiments of the disclosure will be discussed with reference to the following exemplary and non-limiting illustrations, in which like elements are numbered similarly, and where:

FIG. 8 illustrates a table of rewards assigned.

DETAILED DESCRIPTION

Figure 1:
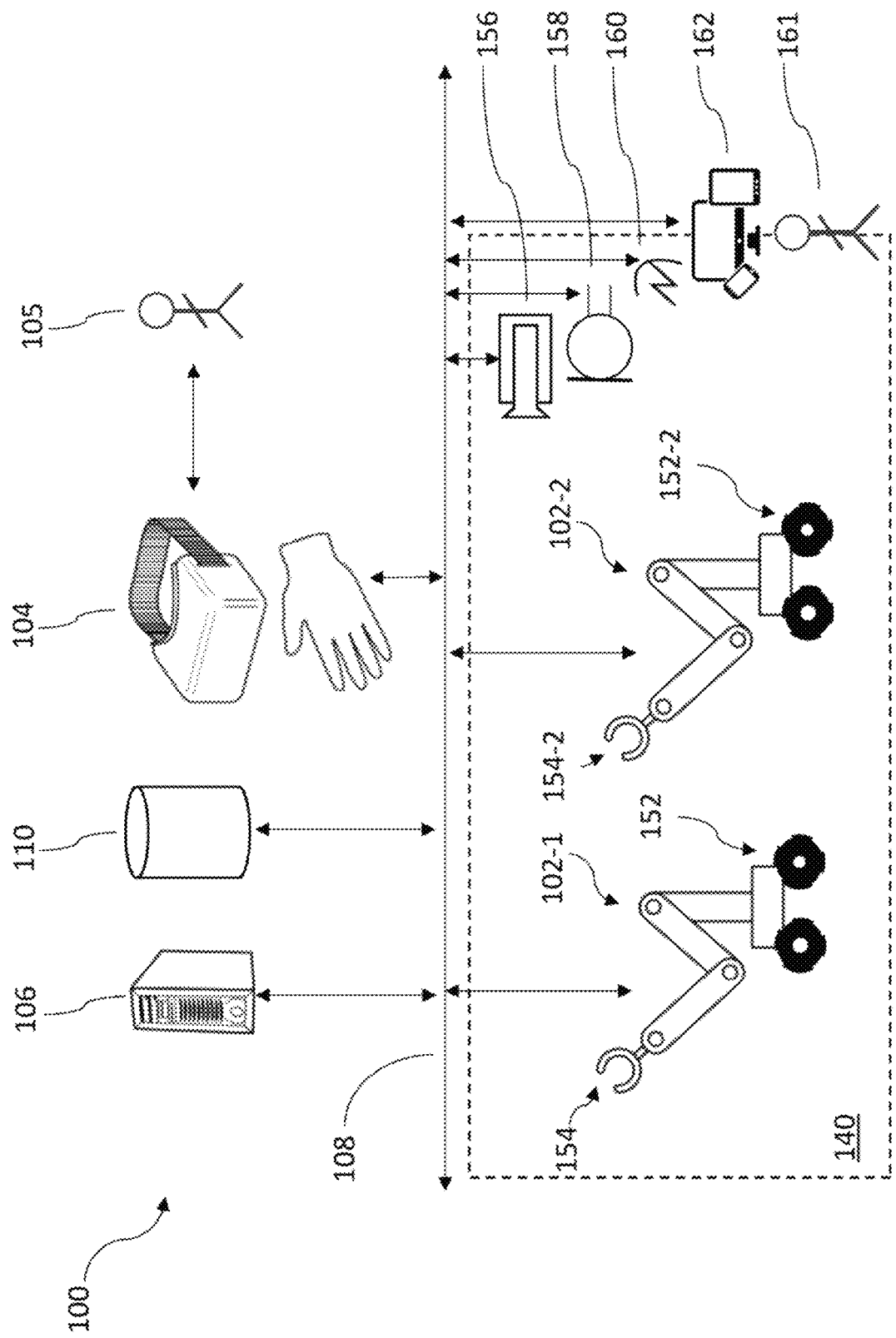
FIG. 1 is a schematic diagram illustrating a portion of a robotic system according to some embodiments of the present disclosure.

In the following description, some specific details are included to provide a thorough understanding of various disclosed embodiments. One skilled in the relevant art, however, will recognize that embodiments may be practiced without one or more of these specific details, or with other methods, components, materials, etc. In some instances, well-known structures associated with end-effectors and/or robotics, such as processors, sensors, storage devices, network interfaces, workpieces, tensile members, fasteners, electrical connectors, mixers, and the like are not shown or described in detail to avoid unnecessarily obscuring descriptions of the disclosed embodiments. In addition, although the present disclosure is described with respect to its application for pick-and-place, grasping, and/or sorting applications, it is understood that the system could be implemented in any setting where a robotic manipulator (e.g., a robotic gripper) may be useful, such as in various stages in a supply chain, assembly line, manufacturing environment, storage and warehouse facility, sorting stations, laboratory, and retail and commercial settings.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one", "an", or "another" applied to "embodiment", "example", means that a particular referent feature, structure, or characteristic described in connection with the embodiment, example, or implementation is included in at least one embodiment, example, or implementation. Thus, the appearances of the phrases "in one embodiment", "in an embodiment", or "another embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the user forms "a", "an", and "the" include plural referents unless the content clearly dictates otherwise. Thus, for example, reference to a robot including "an end-effector" includes an end-effector, or two or more end-effectors. It should also be noted that the term "or" is generally employed in its sense including "and/or" unless the content clearly dictates otherwise.

The headings provided herein are for convenience only and do not interpret the scope or meaning of the embodiments.

Robotic end-effectors assist the robotic system in locating, handling, and positioning objects of varying sizes, dimensions, colors, etc. In many cases, grasp determination or/or verification forms the basis for robotic actions. For example, a system can use a robotic arm and gripper to grasp objects and sort them into various locations. It can be important to verify the number of items in the robotic gripper prior to attempting to stow the item(s) to a designated location. The system may classify the grasped items by quantity (e.g., 0 item, 1 item, or 2+ items) and only proceed with stowing when a certain quantity (e.g., 1 item) of item(s) is grasped.

However, grasp verification has not been properly addressed using conventional techniques. For example, grasp verification has been treated as a static-image classification problem, which fails to take into account the temporal nature of robotic manipulation and is not amenable to technical and/or business goal-based decision making. Grasp verification using conventional techniques are typically rigid and not sufficiently reliable.

Described herein are systems, devices, articles, and methods where classification using temporal information and reinforcement learning are integrated to enhance the performance, flexibility, and reliability of grasp verification. Some embodiments of the present disclosure take advantage of additional information in video clips, while minimizing the increase in time-to-decision. For example, using continuously captured frames from front and back images of the gripper can improve quality of predictions, and a reinforcement learning agent can dynamically generate a trade-off between prediction speed (e.g., based on the number of images processed) and prediction accuracy, in alignment with technically-driven and/or business-driven reward function(s).

FIG. 1 is a schematic diagram illustrating a portion of a robotic system or apparatus 100 according to some embodiments of the present disclosure. Various components of system 100 are optional. As shown, system 100 includes robot 102-1 and robot 102-2 (collectively 102). Robots 102 may be associated with, e.g., communicatively coupled to, one or more optional operator interfaces, e.g., optional operator interface 104. Optional operator interface 104 may include one or more displays and input devices. System 100 includes a computer system 106, an example of a processor-based device. While illustrated as a pair of robots 102 and computer system 106, various implementations can include a greater or lesser number of robots (102) and/or computer systems (106). In some implementations, system 100 includes at least one nontransitory computer- and processor-readable data store or storage device 110.

Robot(s) 102 and computer system 106 are communicatively coupled via a network or non-network communication channel 108. Examples of a suitable network or non-network communication channel 108 include a wire based network or communication channel, optical based network or communication channel, wireless network or communication channel, or a combination of wired, optical, and/or wireless networks or communication channels.

A human operator 105 at operator interface 104 can optionally and/or selectively pilot one or more of robots 102. In human operator controlled (or piloted) mode, the human operator observes representations of sensor data, for example, video, audio, or haptic data received from one or more environmental sensors or internal sensors. The human operator then acts, conditioned by a perception of the representation of the data, and creates information or executable instructions to direct robot(s) 102. Robot(s) 102 operate in, and receive data about, an environment 140 that comprises a physical space. The term "about" is employed here in the sense of represent, characterize, or summarize. The data about an environment 140 is received from one or more sensors. In some implementations, the one or more sensors are on or otherwise carried by robot(s) 102. In some implementations, the one or more sensors are external to or separate from robot(s) 102, such as, camera 156, microphone 158.

In piloted mode, robot(s) 102 execute robot control instructions in real-time (e.g., without added delay) as received from the operator interface 104 without taking into account or revision by the controller based on sensed information.

In some implementations, robot(s) 102, operate without an operator interface 104 or human operator, e.g., autonomously. Robot(s) 102 can operate in an autonomous control mode by executing autonomous control instructions. For example, computer system 106 or robot(s) 102 can use sensor data from one or more sensors associated with operator generated robot control instructions and the operator generated robot control instructions from one or more times robot(s) 102 was in piloted mode to generate autonomous robot control instructions for subsequent use. For example, by using machine learning techniques to extract features from the sensor data such that in autonomous mode the robot(s) 102 autonomously recognize features and/or conditions in its environment and in response perform a defined act, set of acts, a task, or a pipeline of tasks. Exemplary acts include classifying grasped item(s) into different categories (e.g., with associated probabilities) and stowing the item(s) based thereon.

In some implementations, the computer system 106 is a smaller processor based device like a mobile phone, single board computer, embedded computer, and the like. The computer system 106 may, in some instances, be termed or referred to interchangeably as a computer, server, or an analyzer 106. Computer system 106 may create autonomous control instructions for robot(s) 102 or another robot. In some implementations, robot(s) 102 autonomously recognize features and/or conditions in the surrounding environment as represented by a representation (e.g., presentation, depiction) of the environment and one or more virtual items composited into the environment, and in response to being presented with the representation perform one or more actions or tasks.

In some implementations, the computer system 106 includes at least one nontransitory computer- or processor-readable medium (e.g., nonvolatile memory for instance ROM, FLASH EEPROM, volatile memory for instance RAM, spinning media for instance a magnetic hard disk, optical disks) that stores processor-executable instructions, which when executed by at least one processor included in computer system 106 cause the at least one processor to define in part a control system for robot(s) 102 and other agents. For example, computer system 106 may provide an application program interface (API) via which robot(s) 102 or other agents can provide queries to and receive processor-executable instructions or processor-readable data in response. For example, computer system 106 may include a warehouse control system. A warehouse control system includes processor executable instructions, that in response to being executed, controls automated systems such as sortation systems, AS/RS, unmanned ground vehicles (UGVs), automatic guided vehicles (AGVs), sorters, and conveyors in the warehouse. The warehouse control system may direct "real-time" activities within warehouses and distribution centers. For example, a warehouse control system direct robots and workers, e.g., a conveyor or dispatch an AGV, or (de)activate a light in a pick to light system.

In some instances, robot(s) 102 may be controlled autonomously at one time, while being piloted, operated, or controlled by a human operator at another time. That is, operate under an autonomous control mode and change to operate under a piloted mode (i.e., non-autonomous). In a third mode of operation robot(s) 102 can replay or execute piloted robot control instructions in a human operator controlled (or piloted) mode. That is operate without sensor data and replay pilot data.

A robot, like robot(s) 102, is an electro-mechanical machine controlled by circuitry, for example circuitry that includes a processor that executes and follows processor-executable instructions; a human operator controllable electro-mechanical machine; a robotic subsystem (or apparatus) of another machine including a robot; or the like. A robot performs physical acts, actions, or tasks, for example, working with tangible results and/or computational tasks. A robot has the ability to move in a physical space, such as environment 140, to accomplish physical tasks. As well, a robot includes computational resources, on-board and/or remote computational resources, to perform computational tasks. The computational tasks can be in aid of the physical tasks, e.g., planning, as a task, for accomplishing a tangible result to physical task. A robot has the ability to acquire information from sensors, on-board and/or remote sensors. A robot can be part of or included in a larger system like system 100.

A robot can include a propulsion or motion subsystem comprising of one or more motors, solenoids or other actuators, and associated hardware (e.g., drivetrain, wheel(s), treads) to propel the robot in a physical space. The space does not need to be horizontal or terrestrial. Examples of spaces include water, air, underground, vertical spaces, outer space and the like. The robot(s) 102 may operate in distribution center, stock room, or warehouse. These include a tangible place of storage for products. Principal warehouse activities include receipt of items, storage, order picking, and shipment.

A robot typically includes a manipulation subsystem comprising one or more appendages, such as, one or more arms and/or one or more associated end-effectors, arm and end-effector 154-1, 154-2 (collectively 154) of robot 102-1, 102-2. End-effectors can be capable of performing many tasks, including for example grasp, grip, physically releasably engage, or otherwise interact with an item.

System 100 includes a sensor subsystem comprising one or more sensors, such as, one or more image cameras or video cameras 156, and/or one or more microphones 158, and/or one more rangefinders 160 (e.g., radar, LiDAR, 3D camera, or the like). (Robot(s) 102 may include an onboard sensor subsystem. See examples, disclosed herein at, at least, FIG. 2.) A sensor subsystem which acquires data that characterizes or represents the robot(s) 102 in a context or scenario, and/or performing one or more tasks. The data includes environmental sensor information, or environment information, representative of environmental conditions external to robots 102. The data may include item pose information that represents pose of one or more items in environment 140. The data may include manipulator pose that represents pose for one or more parts of one more robots, such as, robot(s) 102 including arm(s) and end-effector(s) 154. Pose information includes processor-readable information that represents a location, an orientation, or both. The pose information (e.g., item, manipulator) may be received from the rangefinder(s) 160, camera(s) 156, arm(s) and end-effector(s) 154, or robot(s) 102.

System 100 includes a worker interface system. System 100 includes one or more worker interfaces 162 coupled to network or non-network communication channel 108. The worker interface(s) 162 include input or output parts. An example of an output part is a display which can present explanatory text or a dynamic representation of robots 102 in a context or scenario. The explanatory text may include a declarative component, i.e., message or directive to a worker 161 to complete some task. For example, a dynamic representation robot includes video and audio feed, for instance a computer-generated animation. A worker 161 may observe or monitor the operation of system 100, robot(s) 102 or the like from worker interface(s) 162. The worker 161 may engage in the operation of system 100 via worker interface (s) 162.

Figure 2:
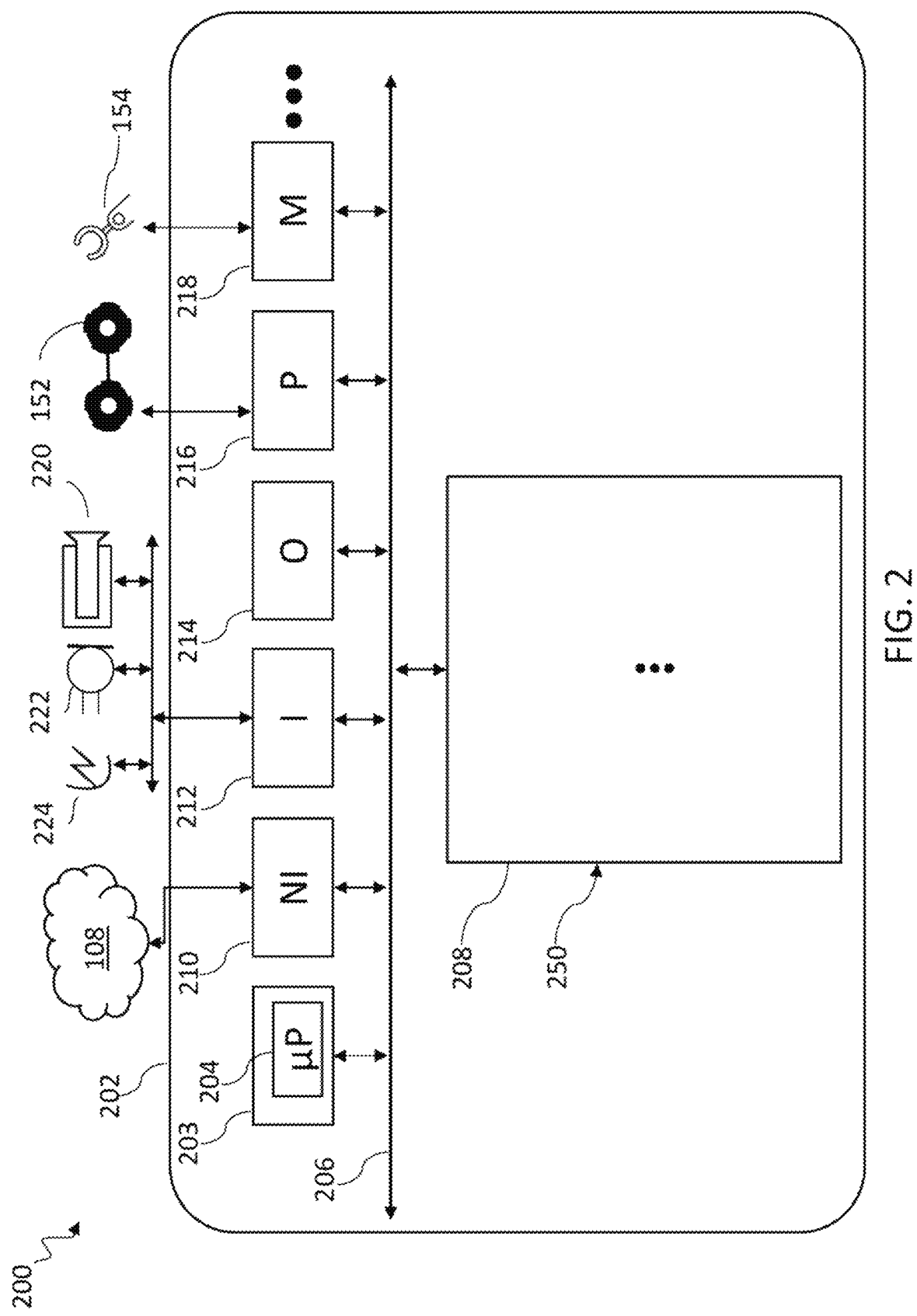
FIG. 2 is a schematic diagram illustrating an exemplary robot suitable for inclusion in the system of FIG. 1.

FIG. 2 schematically shows parts of a robot 200, including a processor, for use in the system 100, shown in FIG. 1, in accordance with some embodiments of the present disclosure. Robot 200 includes at least one body or housing 202, and a control subsystem 203 that includes at least one processor 204, at least one nontransitory computer- and processor-readable storage device 208, and at least one bus 206 to which, or by which, the at least one processor 204 and storage device(s) 208 are communicatively coupled. In some implementations, robot 200 comprises a sub-set of the illustrated robot 200, including control subsystem 203, bus(es) 206, storage device(s) 208, and network interface subsystem 210.

Robot 200 includes a network interface subsystem 210, e.g., a network interface device, that is communicatively coupled to bus(es) 206 and provides bi-directional communication with other systems (e.g., external systems external to the robot 200) via a network or non-network communication channel 108. The network interface subsystem 210 includes one or more buffers. Network interface subsystem 210 receives and sends processor-readable information related to a plurality of items, e.g., processor-executable instructions or specifications on how to process the plurality of items. Network interface subsystem 210 allows robot 200 to be communicatively coupled to a control system via an application program interface, e.g., an application program interface in system 106. Network interface subsystem 210 may be any circuitry effecting bidirectional communication of processor-readable data, and processor-executable instructions, for instance radios (e.g., radio or microwave frequency transmitters, receivers, transceivers), communications ports and/or associated controllers. Suitable communication protocols include FTP, HTTP, Web Services, SOAP with XML, WI-FFM compliant, BLUETOOTH™ compliant, cellular (e.g., GSM, CDMA), and the like. Suitable transportation protocols include TCP/IP, SCTP, and DCCP.

Robot 200 can include an input subsystem 212 comprising one or more sensors that detect, sense, or measure conditions or states of robot 200 and/or conditions in the environment in which the robot operates, and produce or provide corresponding sensor data or information. Such sensors include cameras or other imagers, touch sensors, load cells, pressure sensors, microphones, meteorological sensors, chemical sensors or detectors, or the like.

Robot 200 can include an output subsystem 214 comprising output devices, such as, speakers, lights, and displays. Input subsystem 212 and output subsystem 214, are communicatively coupled to processor(s) 204 via bus(es) 206. In some implementations, input subsystem 212 includes receivers to receive position and/or orientation information. For example, a global position system (GPS) receiver to receive GPS data, two more time signals for the control subsystem 203 to create a position measurement based on data in the signals, such as, time of flight, signal strength, or other data to effect a position measurement. Also for example, one or more accelerometers can provide inertial or directional data in one, two, or three axes.

Robot 200 can include a propulsion or motion subsystem 216 comprising motors, actuators, drivetrain, wheels, and the like to propel or move the robot 200 within a physical space and interact with it. The propulsion or motion subsystem 216 propulsion or motion subsystem comprises of one or more motors, solenoids or other actuators, and associated hardware (e.g., drivetrain, wheel(s), treads), to propel the robot in a physical space. For example, the propulsion or motion subsystem 216 includes drive train and wheels 152.

Robot 200 includes a manipulation subsystem 218, for example comprising one or more arms, end-effectors, associated motors, solenoids, other actuators, linkages, drive-belts, and the like coupled and operable to cause the arm(s) and/or end-effector(s) to move within a range of motions. The manipulation subsystem 218 is communicatively coupled to the processor(s) 204 via bus(es) 206. For example, manipulation subsystem 218 includes arm and end-effector 154.

A person of ordinary skill in the art will appreciate the components in robot 200 may be varied, combined, split, omitted, or the like. In some implementations one or more of the network interface subsystem 210, input subsystem 212, output subsystem 214, propulsion or motion subsystem 216 and/or manipulation subsystem 218 are combined. In some implementations, one or more of the subsystems (e.g., input subsystem 212) are split into further subsystems. In some implementations, bus(es) 206 is a plurality of buses (e.g., data buses, instruction buses, power buses) included in at least one body. For example, as part of a modular computing architecture where computational resources at distributed over the components of robot 200. In some implementations, computational resources are located in the interstitial spaces between structural or mechanical components of the robot 200. In some implementations, the computational resources distributed over the body include redundant computational resources.

The at least one processor 204 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The at least one processor 204 may be referred to in the singular, but may be two or more processors.

The at least one storage device 208 is at least one nontransitory or tangible storage device. In some implementations, storage device(s) 208 includes two or more distinct devices. The storage device(s) 208 can, for example, include one or more volatile storage devices, for instance random access memory (RAM), and one or more non-volatile storage devices, for instance read only memory (ROM), Flash memory, magnetic hard disk (HDD), optical disk, solid state disk (SSD), and the like. A person of skill in the art will appreciate storage may be implemented in a variety of ways such as a read only memory (ROM), random access memory (RAM), hard disk drive (HDD), network drive, flash memory, digital versatile disk (DVD), any other forms of computer- and processor-readable memory or storage medium, and/or a combination thereof. Storage can be read only or read-write as needed. Further, modern computer systems and techniques conflate volatile storage and non-volatile storage, for example, caching, using solid-state devices as hard drives, in-memory data processing, and the like.

The at least one storage device 208 includes or stores processor-executable instructions and/or processor-readable data 250 associated with the operation of robot 200, system 100, and the like. Herein processor-executable instructions or data includes processor-executable instructions and/or processor-readable data. Herein and associated drawings instructions includes processor-executable instructions and/or processor-readable data.

The execution of the processor-executable instructions or data cause the at least one processor 204, or control subsystem 203, to carry out various methods and actions, for example via the propulsion or input subsystem 212, and/or manipulation subsystem 218. The processor(s) 204 can cause a robot, such as robot 200, to carry out various methods and actions disclosed herein, e.g., item identification, grasp verification, item manipulation, or the like.

Figure 3:
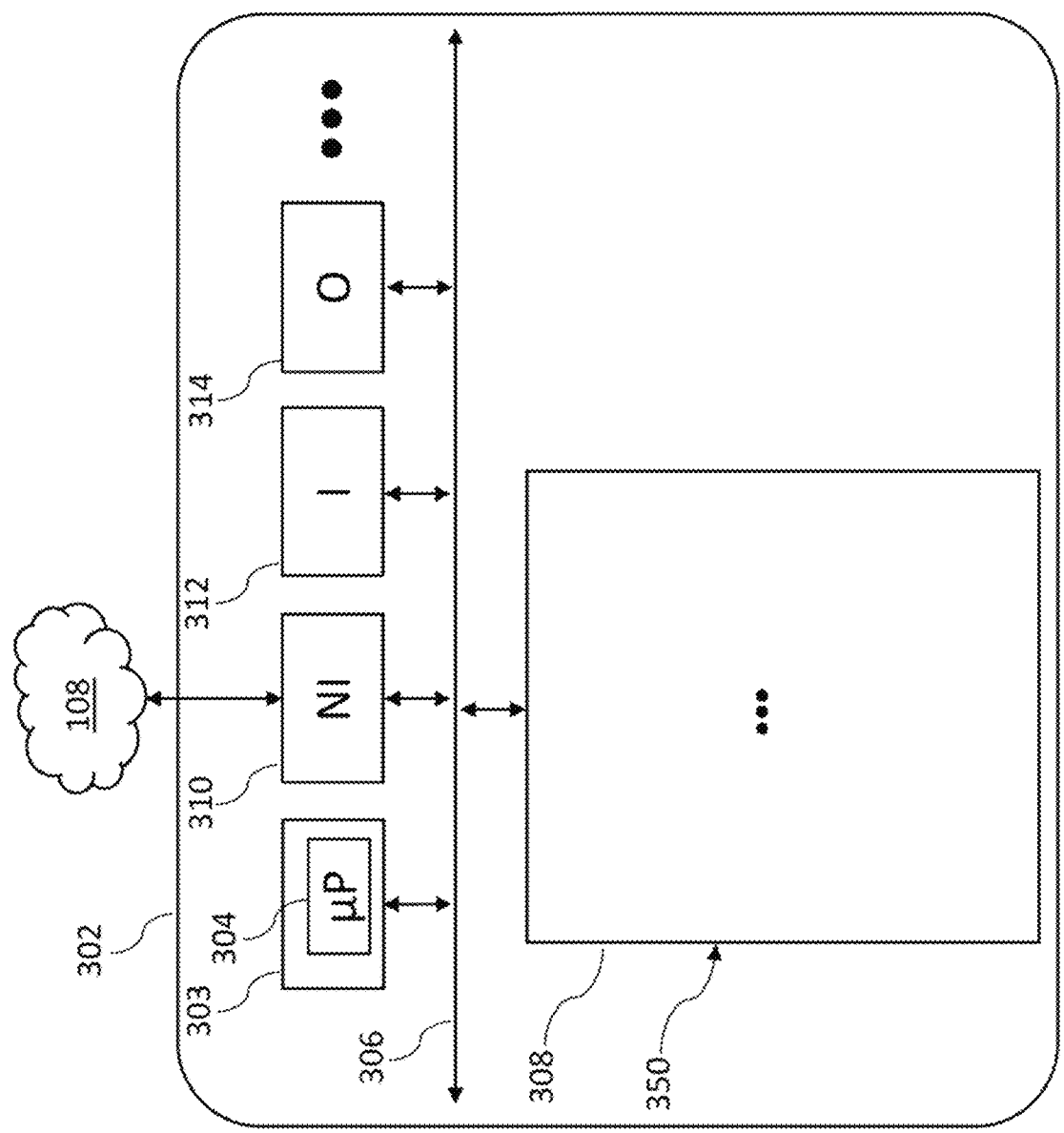
FIG. 3 is a schematic diagram illustrating an exemplary processor-based device suitable for inclusion in the system of FIG. 1.

FIG. 3 schematically shows exemplary parts of a system 300, including a processor, that may be used as computer system 106 in FIG. 1. System 300 shares some similar components with robot 200 but typically differs in lacking the propulsion or motion sub-system and the manipulation sub-system. System 300 has different components within some sub-systems, such as, an input subsystem 312 and output subsystem 314.

System 300 includes at least one body or housing 302, and a control subsystem 303 that includes at least one processor 304, at least one nontransitory computer- or processor-readable storage device 308, and at least one bus 306 to which the at least one processor 304 and the at least one nontransitory computer- or processor-readable storage device 308 are communicatively coupled. System 300 includes a network interface subsystem 310 is communicatively coupled to bus(es) 306 and provides a bi-directional communicative coupler among system 300 and other systems (e.g., processor-based devices associated with warehouse management systems, online storage providers) via network or non-network communication channel 108.

System 300 includes an input subsystem 312. Input subsystem 312 may include one or more user interface input devices, such as, a touch display, a keyboard, a mouse or other pointer device, a microphone, and a camera. In some implementations, input subsystem 312 is coupled to control subsystem 303 via network interface subsystem 310. In some implementations, input subsystem 312 includes one or more sensors such as environmental sensors.

System 300 includes an output subsystem 314 comprising one or more output devices, such as, displays, speakers, and lights. Input subsystem 312 and output subsystem 314, are communicatively coupled to the processor(s) 304 via bus(es) 206. Storage device(s) 308 includes or stores processor-executable instructions or data 350 associated with the operation of system 300, or system 100. Processor-executable instructions or data, when executed by control subsystem 303, can generate autonomous robot control instructions in accordance with various embodiments of the present disclosure.

Figure 4:
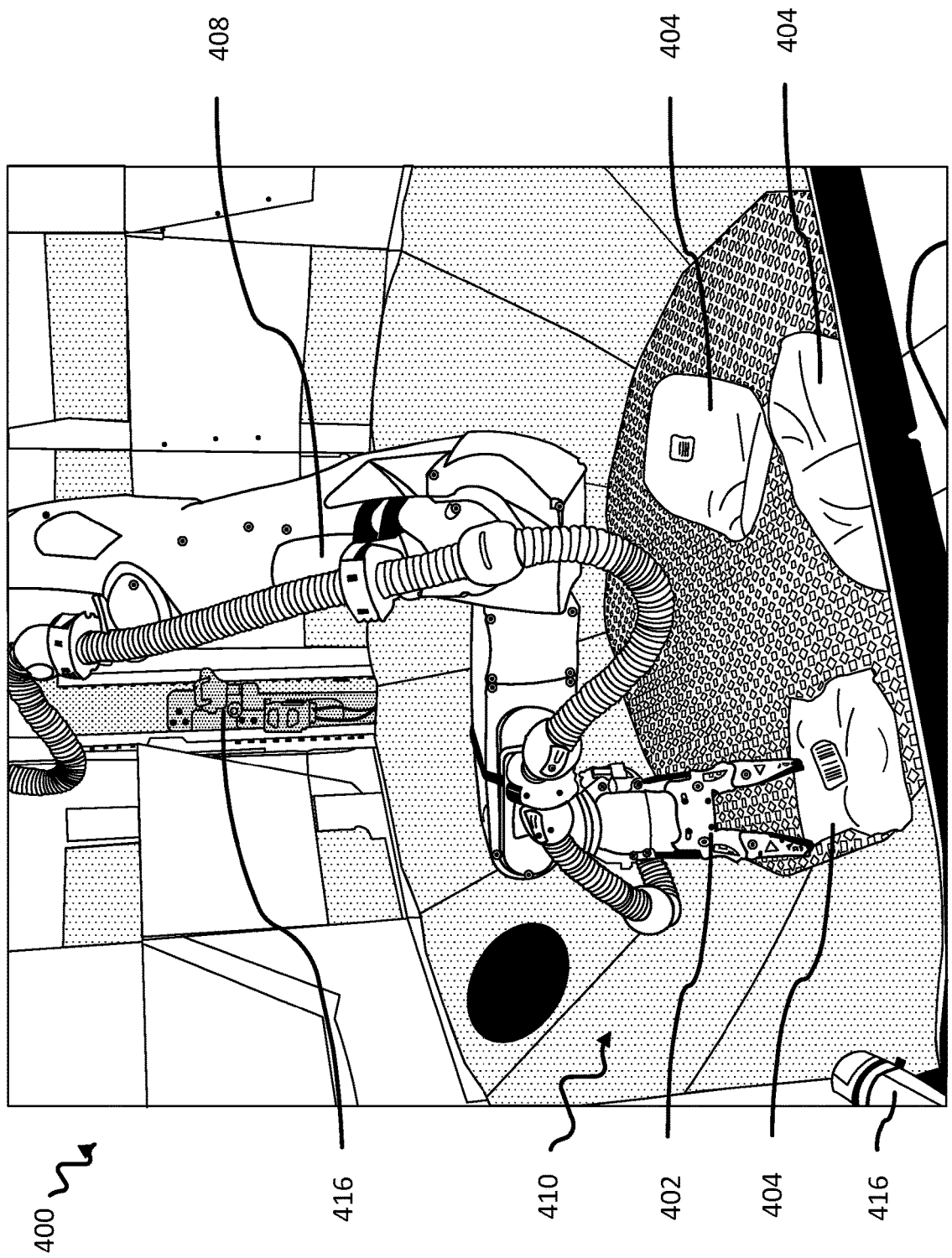
FIG. 4 illustrates, in perspective view, a portion of a device that includes at least one robotic end-effector capable of grasping items, one or more sensors, and an operating area according to some embodiments of the present disclosure.

FIG. 4 illustrates, in perspective view, a portion of a device 400 that includes at least one robotic end-effector 402 capable of grasping items 404, one or more sensors 406, and an operating area 410 according to some embodiments of the present disclosure. In some embodiments, the device 400 is part of the system 100 as shown in FIG. 1.

As shown in FIG. 4, the robotic end-effector 402 is a gripper attached to a robotic arm 408, which can be utilized within a storage space or an assembly line. The storage space, as used herein, can be a bin, box, sorting station, room, or volume that is used to store, hold, warehouse, or otherwise contain objects.

The sensors 406 include two cameras, where one camera is positioned in front of the robot arm 408, and the other camera is positioned in the back of the robot arm 408, as shown in FIG. 4. In various embodiments, the sensors 406 are not limited to two cameras, and multiple cameras (and/or other sensors such as radar, LiDAR, barcode reader, or infrared sensor) positioned at various locations around the robotic arm 408 can be utilized. For example, cameras can be positioned at intervals around the robotic arm 408, so that a 360-degree field of capture can be created around a horizontal plane about the robotic arm 408. Similarly, multiple cameras can be positioned above and below the robotic arm 408 at various vertical heights. In some embodiments, the robotic arm 408 and/or the robotic end-effector 402 itself can include sensor(s) (e.g., cameras) that capture the grasping mechanism.

The cameras used herein can capture video footage, still images, and sound generated in the environment or generated by the robotic mechanism. In some embodiments, the technology disclosed herein can incorporate both video footage and still images into its grasp verification process. In addition, the cameras can include a pan and zoom feature, which can be controlled by the system in order to obtain optimal footage of the grasping mechanism. Furthermore, the cameras can include a strobe, flash, or night vision function that can enhance the image or captured video feed quality.

In some embodiments, the cameras can be coupled to a motion tracking system, such that cameras can be controlled to follow movement of the robotic grasping mechanism. In some embodiments, the cameras can continuously capture video footage of the robotic end-effector 402. In some embodiments, the camera recording is triggered when the system detects movement of the robot arm 408 and/or the robotic end-effector 402.

In some embodiments, in a configuration with more than two cameras, the system selects the optimal cameras to utilize for recording, and only activates certain cameras that have a clear or maximized view of the grasping mechanism. In some embodiments, the technology disclosed herein is implemented within a retail supply chain warehouse, where the objects 404 include apparel, consumer goods, merchandise, and the like. However, the presently disclose technology is not intended to be limited to a retail supply chain setting, and the objects 404 can include tools, parts, components, packages, letters, foodstuffs, or the like.

Figure 5:
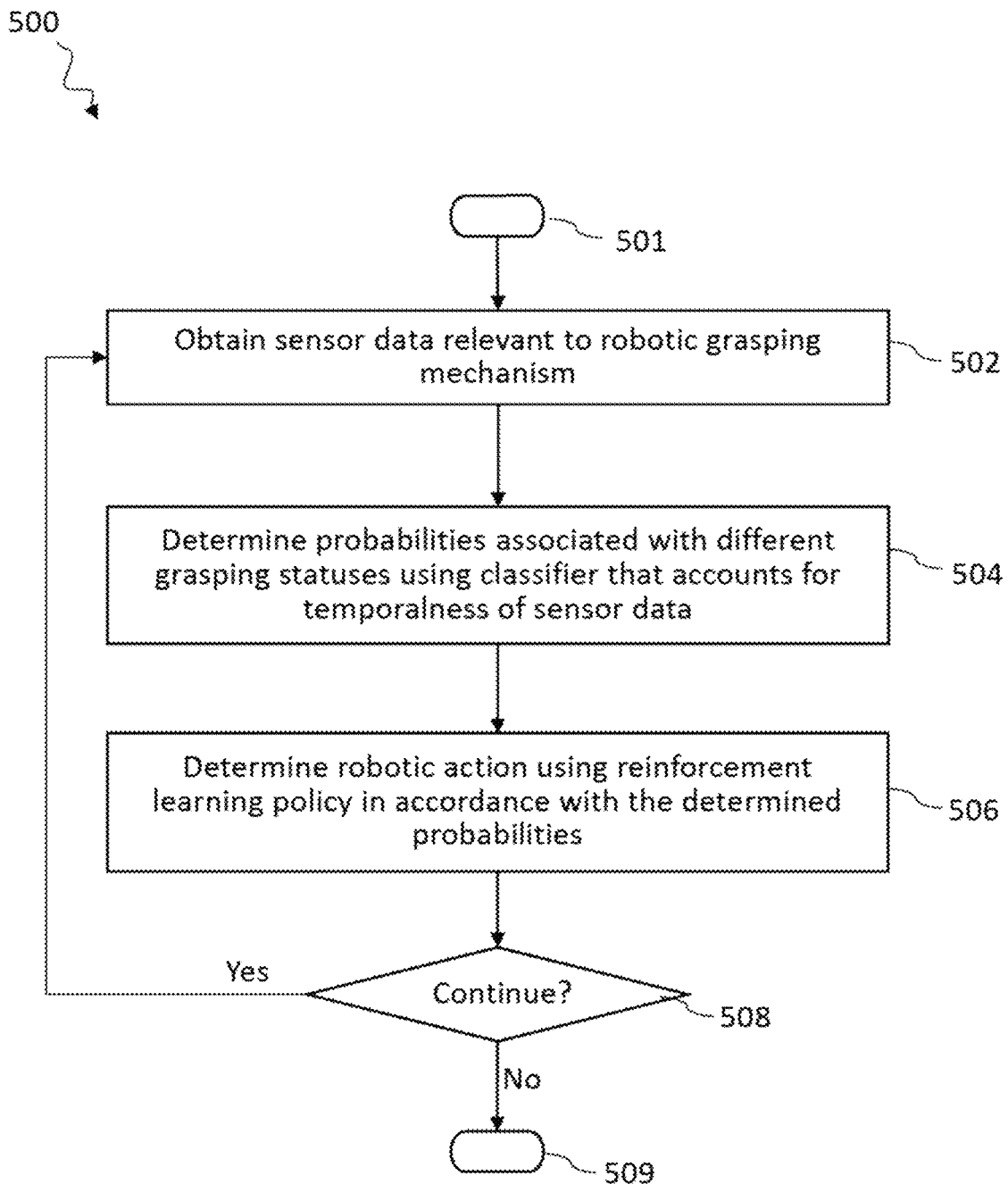
FIG. 5 is a flow-diagram of a method for grasp verification implemented in a system including at least one processor, according to some embodiments of the present disclosure.

FIG. 5 is a flow-diagram of a method 500 for grasp verification implemented in a system including at least one processor, according to some embodiments of the present disclosure.

At block 502, the method 500 includes obtaining sensor data relevant to a robotic grasping mechanism (e.g., as implemented in accordance with the device 400 of FIG. 4). In some embodiments, the sensor data includes static images, image sequences, and/or video clips depicting a robotic gripper grasping zero, one, or multiple items. In some embodiments, the sensor data includes distance or depth data collected by a radar, LiDAR, 3D camera, or other range finders. In some embodiments, the sensor data includes features extracted or detected by a barcode reader, movement sensor, infrared sensor, or the like. In some embodiments, the sensor data includes most recent data collected by one or more sensors. In some embodiments, the sensor data further includes data collected by the one or more sensors over a period of time.

Figure 6:
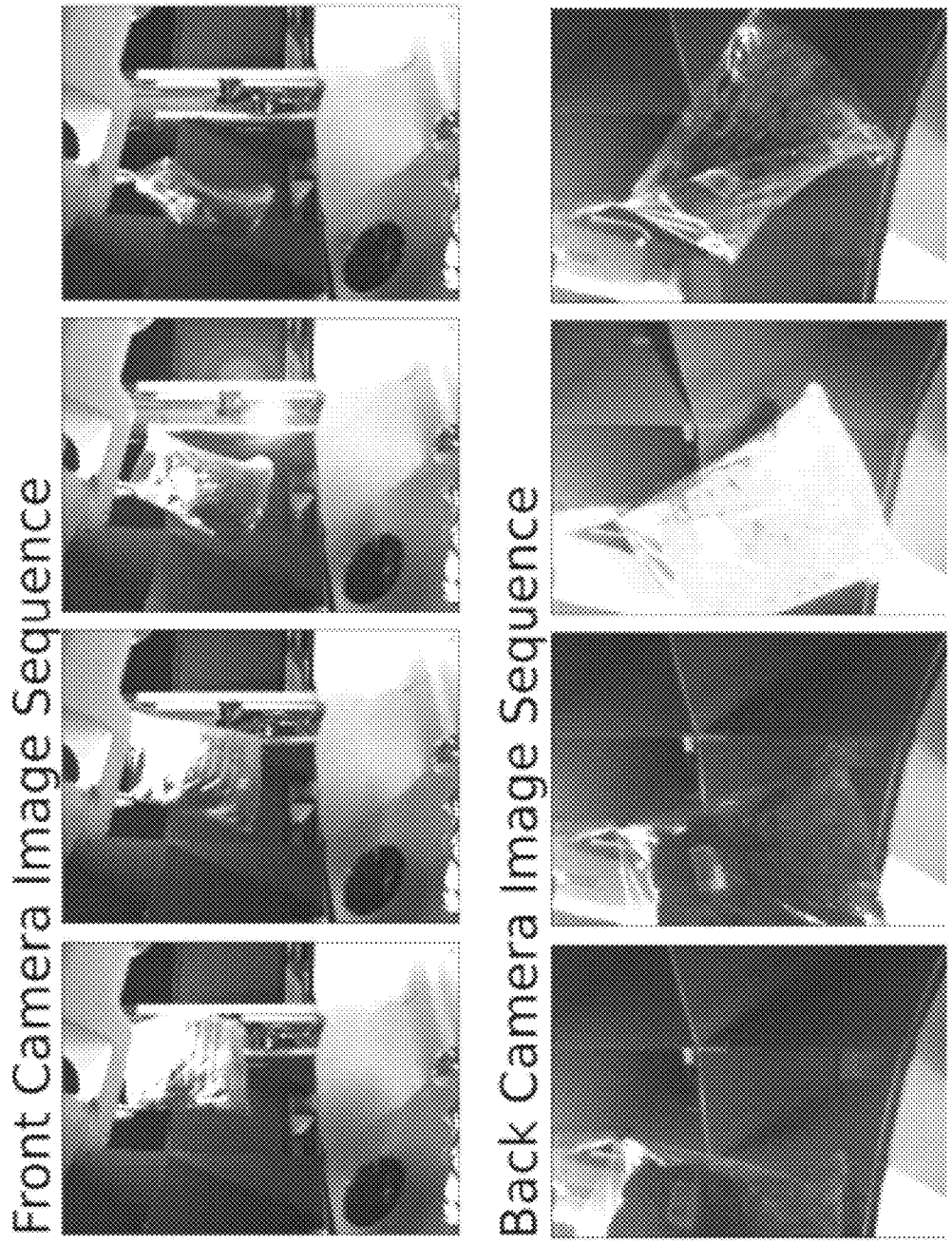
FIG. 6 illustrates image sequences obtained from the front and back cameras as shown in FIG. 4, as an example of sensor data in accordance with some embodiments of the present disclosure.

As an example of the sensor data, FIG. 6 illustrates image sequences obtained from the front and back cameras as shown in FIG. 4. The front and back cameras can produce video clips including multiple frames, from which image sequences can be obtained. As shown in FIG. 6, each image sequence include images taken consecutively within a period of time (e.g., 0.1, 0.5, 1, or 5 seconds). Each image can show the robotic grasping mechanism under the same or different lighting or other environment conditions. Illustratively, the images in FIG. 6 show that a single item (e.g., a single bag of goods) has been grasped.

Referring back to FIG. 5, at block 504, the method 500 includes determining probabilities or likelihoods associated with different grasping statuses, using classifier(s) that accounts for, in part, the temporal aspect of the sensor data. In some embodiments, the different grasping statuses are pre-defined in accordance with various technological and/or business contexts, environment conditions, and/or item attributes. For example, the grasping statuses can be defined based on item quantity: "0 item grasped" as a first class, "1 item grasped" as a second class, and "2 or more items grasped" as a third class.

The classifier takes the presently obtained sensor data (and in some embodiments, previously obtained sensor data as well) as input, and generates the probabilities or likelihoods associated with the different grasping statuses as output. The classifier implements algorithm(s) or model(s) that accounts for the temporal aspect of the sensor data (e.g., the timing and/or order of images). The classifier achieves this explicitly (e.g., as part of input) and/or implicitly (e.g., as parameter(s) and/or state(s)).

Figure 7:
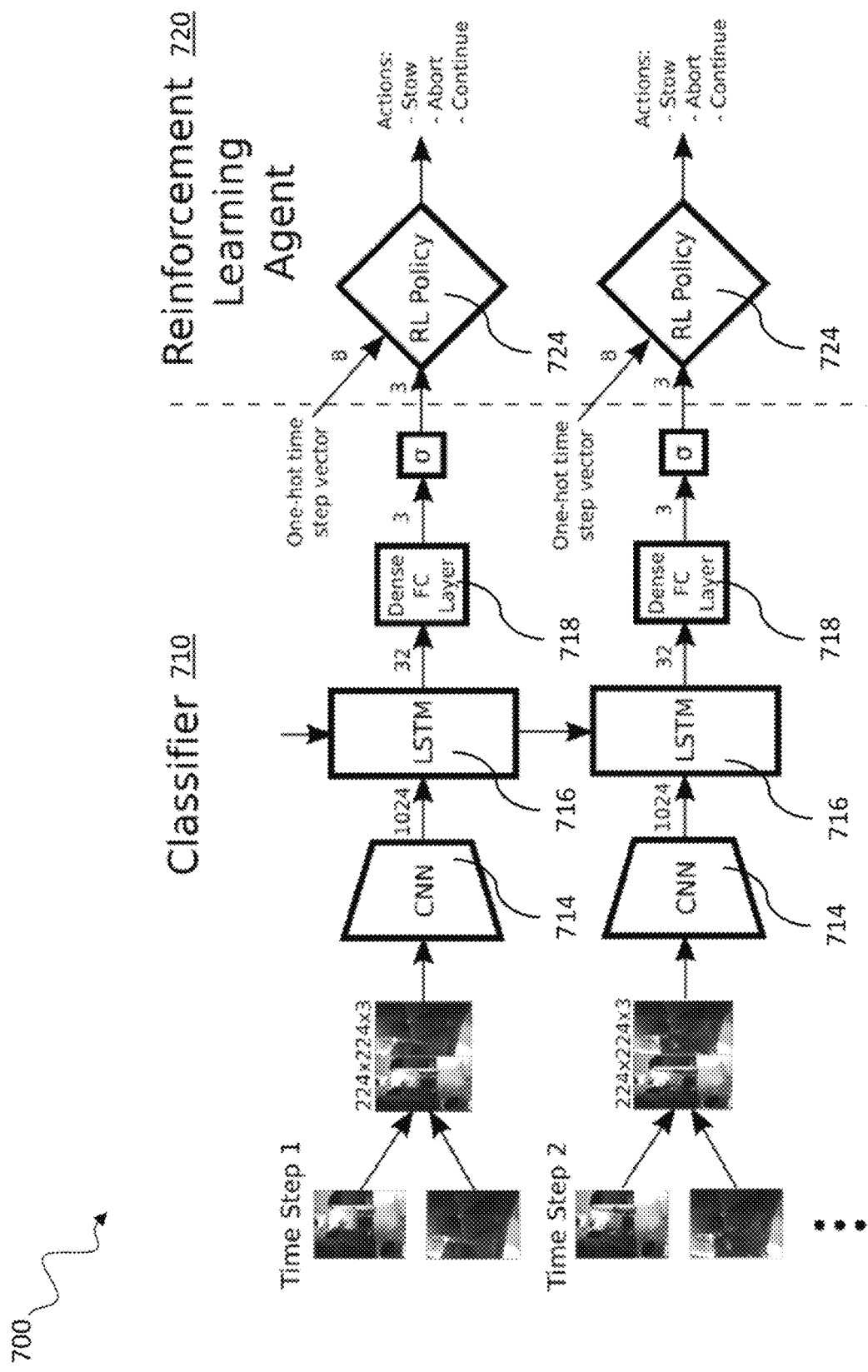
FIG. 7 illustrates an exemplary of a computational architecture including a classifier and a reinforcement learning agent according to some embodiments of the present disclosure.

As an example, FIG. 7 illustrates a computational architecture 700 including a classifier 710 and a reinforcement learning agent 720 according to some embodiments of the present disclosure. Here, the classifier 710 includes one or more convolutional neural networks (CNNs) 714 and one or more long short-term memory (LSTM) networks 716.

A CNN includes an input and an output layer, as well as one or more hidden layers. The hidden layers of a CNN typically includes a series of convolutional layers that convolve with a multiplication or other dot product. The activation function of the CNN is commonly a RELU layer, and can subsequently followed by additional convolutions such as pooling layers, fully connected layers, or normalization layers, which are generally referred to as hidden layers because their inputs and outputs are masked by the activation function and final convolution. The final convolution, in turn, often involves backpropagation in order to more accurately weight the end product. Though the layers are colloquially referred to as convolutions, this is only by convention. Mathematically, it is technically a sliding dot product or cross-correlation. This has significance for the indices in a matrix, in that it affects how weight is determined at a specific index point.

Long short-term memory (LSTM) is an artificial recurrent neural network (RNN) architecture. Unlike standard feedforward neural networks, LSTM has feedback connections.

It can not only process single data points (such as images), but also entire sequences of data (e.g., image sequences or sequence of other sensor data). A common LSTM unit is composed of a cell, an input gate, an output gate and a forget gate. The cell remembers values over arbitrary time intervals and the three gates regulate the flow of information into and out of the cell. LSTM networks can be used, at least in part, to classify, process, and/or make predictions based on time series data, since there can be lags of unknown duration between important events in a time series.

Illustratively, at each point in time (e.g., Time Step 1 and Time Step 2 as shown in FIG. 7), sensor data is obtained in real time and fed into the CNN(s) 714 with or without preprocessing. For example, the RGB images collected from the front and back cameras of FIG. 4 can be fed into two separate, independent CNNs; alternatively, as shown in FIG. 7, the front and back RGB images are concatenated (e.g., along the horizontal axis) and fed into a single CNN for processing. Here, in comparison with the former, the latter can be faster to process with limited computational resources, without necessarily sacrificing accuracy. In some embodiments, instead of feeding the CNN(s) with sensor data (e.g., single images captured by the front and back cameras) captured at a specific moment (e.g., Time Step 1), sensor data (e.g., image sequence or multiple frames captured by the front and back cameras) of a time "window" that starts, ends, or otherwise overlaps with the specific moment are fed to the CNN(s). The output of the CNN(s) 714 (e.g., a CNN feature vector having a length of 1024) is then fed into the LSTM(s) 716, which also includes feedback to itself at each point in time based on a state achieved from the previous point in time. In this way, the classifier 710 learns or otherwise accounts for the sequential nature of the images.

The LSTM(s) 716 outputs a feature vector (e.g., having a reduced length of 32), which is fed into a dense layer 718 with softmax activation to further reduce the dimensionality of the data and generate properly sized output from the classifier 710. As shown in FIG. 7, the output from the classifier is a vector having a length of 3, indicating respective probabilities (e.g., between 0 and 1) associated with 3 grasping statuses: "0 item grasped," "1 item grasped," and "2 or more items grasped." The model weights of the CNN(s) 714, the LSTM(s) 716, and/or other neural network component(s) of the classifier 710 can be trained on previously collected sensor data with manual labeling of "ground truth" grasping statuses. In various embodiments, different components of the classifier 710 (e.g., the CNN(s) 714 and the LSTM(s) 716) can be trained jointly in an end-to-end manner, or separately using different training data sets.

In various embodiments, different structures or techniques can be employed by the classifier. For example, decision trees, statistical hierarchical models, support vector machines, traditional recurrent neural networks (RNNs), hidden Markov models, and/or others can be used to replace or supplement corresponding components of the classifier 710.

Referring back to FIG. 5, at block 504, the method 500 includes determining robotic action(s) using reinforcement learning policy in accordance with the determined probabilities. The robotic actions can be pre-defined, and a table of reward values ("rewards") can be pre-determined to associate with individual robotic actions with each grasping status. FIG. 8 illustrates a table of rewards assigned.

In accordance with this example, the robotic actions include:
Abort—Stop the current grasp, and retry;
Continue—Wait for another image; and
Stow—Stow the item(s) grasped by the end-effector (e.g., gripper).

The grasping statuses, in the same context as described above, include 3 classes: "0 item grasped," "1 item grasped," and "2 or more items grasped." Here, the only positive reward "5" is assigned to action "Stow" when applied to a true "1 item grasped" status.

Referring back to FIG. 7 as an example, the reinforcement learning agent 720 is used to learn and embody the reinforcement learning policy used herein. The reinforcement learning agent receives (a) the output from the classifier 710 and (b) data indicating the current point in time (e.g., the "one-hot time step vector" encoding the current time step) as inputs, and generates a robotic action decision as output. In various embodiments, the method 500 further includes generating control instructions (or causing another component or module to generate the control instructions) that control the robotic arm and end-effector to act in accordance with the decision.

The reinforcement learning agent 720 can be trained on a validation data set including manually labeled sensor data, using Q-Learning algorithm based on the table of rewards. In some embodiments, a single-layer perceptron Q-function estimator is implemented as the reinforcement learning agent, which in many cases can match multi-layer perceptron and outperform a discrete Q-table. In various embodiments, the classifier 710 and the reinforcement learning agent 720 are trained jointly in an end-to-end manner using a same set of training data; alternatively, the classifier 710 and the reinforcement learning agent are trained independently on separate data sets.

Robotic action(s) can be added to or removed from the policy, and the table of rewards can be adjusted (e.g., adjusting the "Continue" rewards) to achieve a target balance between accuracy and speed (e.g., number of images required before "Abort" or "Stow" action). In some embodiments, the method 500 includes receiving changes to the robotic action(s) and/or table of rewards from a user. In some embodiments, the method 500 includes automatically making the changes based on system performance and/or a target goal.

At block 508, the method 500 includes determining whether to continue data classification and robotic action determination. For example, if sensor data indicates that there remains items to be sorted, the method 500 continues and proceeds back to block 502. Otherwise, the method 500 ends.

In various embodiments, alternative and/or additional techniques are used to achieve certain aspects of grasp determination or/or verification. In some embodiments, independent predictions from multiple points in time (e.g., different time steps) are combined. For example, rather than using an RNN or LSTM unit to account for the temporal aspect of sensor data, one or more CNN models can be applied independently in each time step, and the CNN output results (e.g., classification or status predictions) from these time steps can be averaged or otherwise combined over time (e.g., based on a sliding time window that covers a threshold number of past time steps).

In some embodiments, data from different sensors are processed (e.g., by a respective CNN model) independent from one another, and the resultant feature vectors are concatenated or otherwise combined. For example, rather than concatenating the front and back images as shown in FIG. 7 (which creates manmade border(s) without contributing useful information), the front and back images can be fed into two different, independent CNNs, whose outputs are concatenated or otherwise combined before being fed into the LSTM.

In some embodiments, some components of the classifier are pre-trained based on manually labeled data, while other components are trained "on the fly" while grasp verifications and corresponding robotic actions are carried out. In some embodiments, fully-connected dense layers are placed in various locations (e.g., after CNN output and before input to RNN, after RNN and before softmax and/or sigmoid activation) of a neural network-based classifier.

In some embodiments, optical flow maps between video frames are part of input to the classifier. In some embodiments, an "attention mask" is computed by performing pixelwise subtraction of a current image from pixelwise median of all previous images in a sequence, and used as part of input to the classifier.

In some embodiments, the classifier is trained to minimize cross-entropy loss on its predictions in a first training stage, and then the reinforcement learning agent is trained to learn a decision policy in a second training stage. Alternatively, the entire model including both the classifier and the reinforcement learning agent is trained end-to-end based on Q-learning loss updates. In some cases, this approach can achieve higher rewards.

While the principles of the disclosure have been illustrated in relation to the exemplary embodiments shown herein, the principles of the disclosure are not limited thereto and include any modification, variation or permutation thereof.

What is claimed is:

1. A computer-implemented method of controlling a robotic apparatus for manipulating objects, comprising:
   at a time window at least partially overlapping with a first point in time, obtaining first sensor data indicating at least a portion of an environment where the robotic apparatus resides;
   feeding the first sensor data to at least one convolutional neural network (CNN) to generate a first output that feeds into at least one long short-term memory (LSTM) network;
   at a time window at least partially overlapping with a second point in time that succeeds the first point in time, obtaining second sensor data indicating at least a portion of the environment;
   feeding the second sensor data to the at least one CNN to generate a second output that feeds into the at least one LSTM network, the LSTM network further receiving feedback to itself based on a state of the LSTM achieved from the first point in time;
   determining a robotic action based, at least in part, on an output of the at least one LSTM network; and
   causing the robotic apparatus to perform the robotic action.

2. The method of claim 1, wherein the first sensor data includes a first image and the second sensor data includes a second image.

3. The method of claim 2, wherein the first image and second image are consecutive images within a sequence of images.

4. The method of claim 1, wherein the robotic apparatus includes a robotic end-effector used to grasp one or more objects.

5. The method of claim 4, wherein a plurality of statuses of the robotic apparatus are defined in accordance with a quantity of objects grasped by the robotic end-effector.

6. The method of claim 1, wherein determining the robotic action comprises applying at least one reinforcement learning policy.

7. The method of claim 6, wherein the reinforcement learning policy is applied, at least in part, to information indicating the second point in time.

8. A non-transitory computer-readable medium storing contents that, when executed by one or more processors, cause the one or more processors to perform acts comprising:
   feeding first sensor data to at least one convolutional neural network (CNN) to generate a first output that feeds into at least one long short-term memory (LSTM) network, the first sensor data indicating at least a portion of an environment where a robotic device resides, and the first sensor data obtained at a time window at least partially overlapping with a first point in time;
   feeding second sensor data to the at least one CNN to generate a second output that feeds into the at least one LSTM network, the LSTM network further receiving feedback to itself based on a state of the LSTM achieved from the first point in time, and the second sensor data obtained at a time window at least partially overlapping with a second point in time;
   determining a robotic action based, at least in part, on an output of the at least one LSTM network; and
   causing the robotic device to perform the robotic action.

9. The computer-readable medium of claim 8, wherein the acts further comprise applying a classifier to at least a subset of the first sensor data to assess at least a status of the robotic device prior to the feeding of second sensor data to the at least one CNN.

10. The computer-readable medium of claim 9, wherein the acts comprise updating the classifier based on at least a subset of the second sensor data.

11. The computer-readable medium of claim 10, wherein the acts further comprise applying the updated classifier to at least a subset of third sensor data indicating at least a portion of the environment.

12. The computer-readable medium of claim 8, wherein determining the robotic action is based further on at least one reinforcement learning policy in accordance with reward values assigned to different status-action pairs.

13. The computer-readable medium of claim 12, wherein the reward values include positive and negative numbers.

14. A system, comprising:
   one or more processors; and
   memory storing contents that, when executed by the one or more processors, cause the system to:
      feed first sensor data obtained at a time window at least partially overlapping with a first time to at least one convolutional neural network (CNN) to generate a first output that feeds into at least one long short-term memory (LSTM) network;
      feed second sensor data obtained at a time window at least partially overlapping with a second time to the at least one CNN to generate a second output that feeds into the at least one LSTM network, the LSTM network further receiving feedback to itself based on a state of the LSTM achieved from the first time;
      determine a robotic action based, at least in part, on an output of the at least one LSTM network; and
      cause a robotic device including a robotic end-effector to perform the robotic action.

15. The system of claim 14, wherein the robotic action includes at least one of (a) abort—stop a current grasp with the robotic end-effector, and retry, (b) continue—wait for third sensor data to be obtained, or (c) stow—stow at least one item grasped by the robotic end-effector.

16. The system of claim 14, wherein first time precedes the second time.

17. The system of claim 16, wherein the first time and the second time are two points within a time sequence of sensor data obtained.

18. The system of claim 14, wherein determining the robotic action includes applying a trained reinforcement learning agent.

19. The system of claim 18, wherein the reinforcement learning agent is trained independently from training of the CNN and LSTM.

* * * * *